Figure 5:
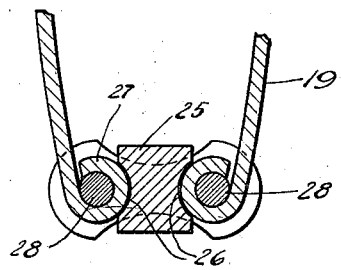

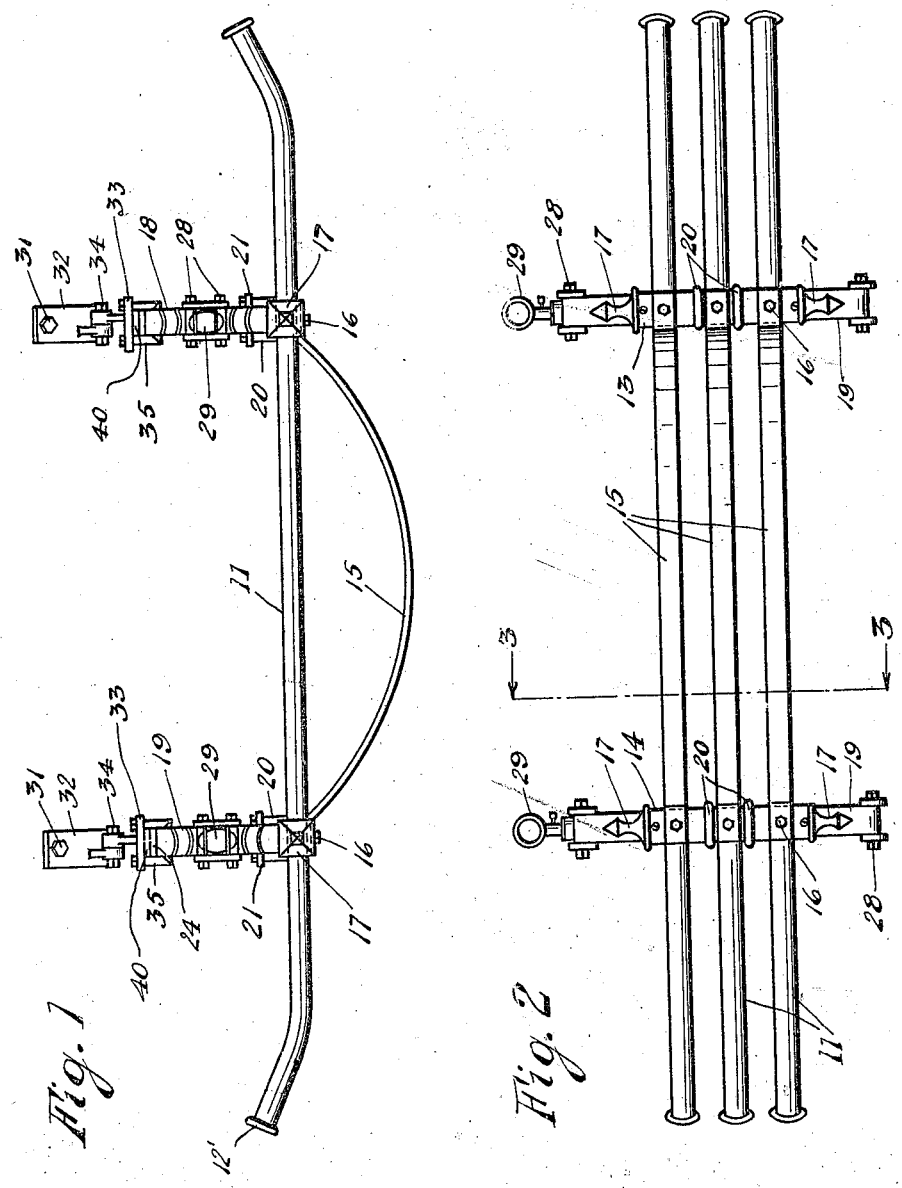

May 8, 1923.
J. A. NOMICOS
VEHICLE BUMPER
Filed July 28, 1922
1,454,133
3 Sheets-Sheet
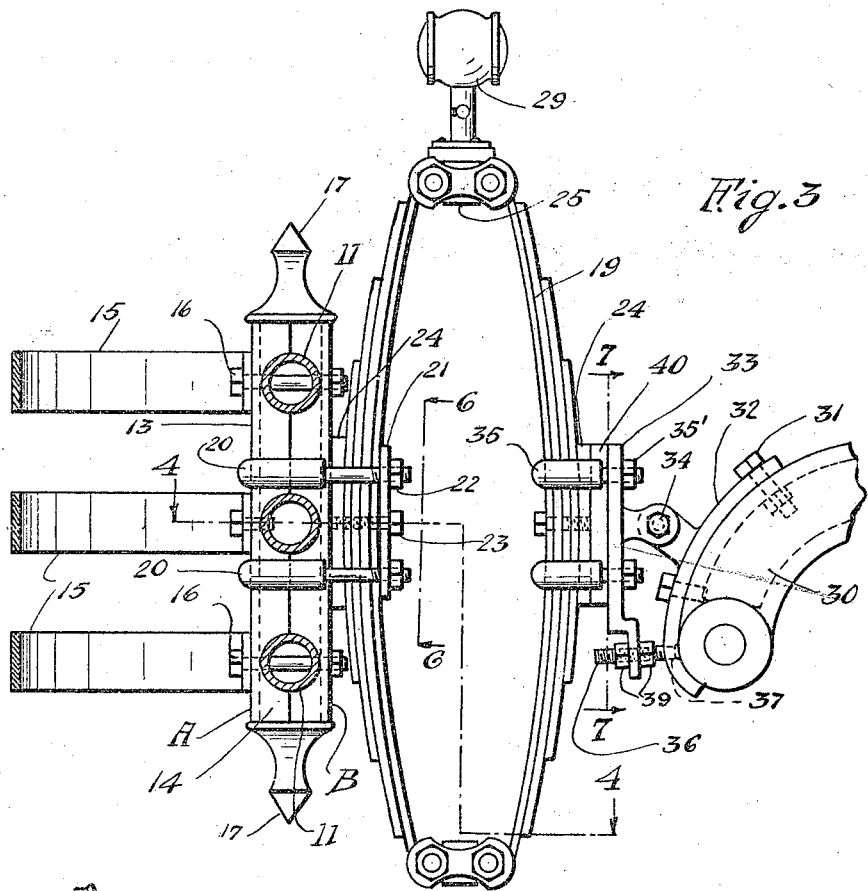
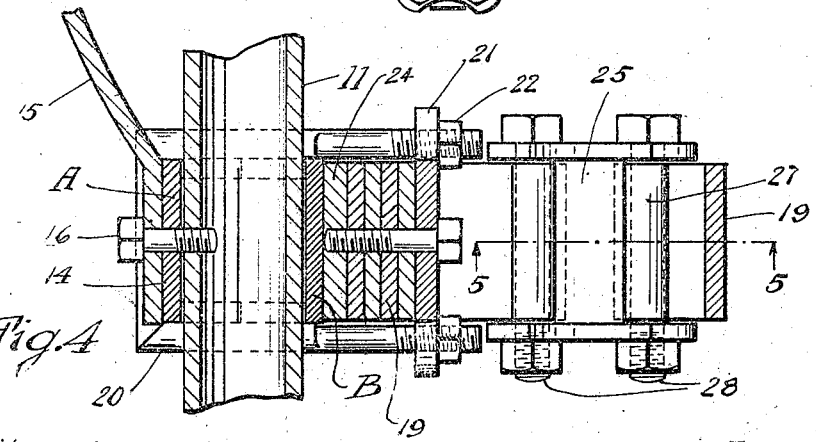
Witnesses:
Inventor:
James A. Nomicos
By Joshua R. H. Potts
His Attorney May 8, 1923.

J. A. NOMICOS

VEHICLE BUMPER

Filed July 28, 1922

1,454,133

3 Sheets-Sheet 3

Witnesses:

Inventor:
James A. Nomicos
By Joshua R. H. Potts
His Attorney

Patented May 8, 1923.

1,454,133

UNITED STATES PATENT OFFICE.

JAMES A. NOMICOS, OF CHICAGO, ILLINOIS.

VEHICLE BUMPER.

Application filed July 28, 1922. Serial No. 578,083.

*To all whom it may concern:*

Be it known that I, JAMES A. NOMICOS, a citizen of the United States, and a resident of the city of Chicago, county of Cook, and State of Illinois, have invented certain new and useful Improvements in Vehicle Bumpers, of which the following is a specification.

My invention relates to new and useful improvements in vehicle bumpers and has for its principal object the provision of an improved construction of this character which will be highly efficient in use and economical in manufacture.

Among the salient objects of the invention is the provision of shock absorbers which cooperate with each other and one being capable of diminishing the impact before transmitted to the other. The construction, comprising the preferred form of my invention, is to provide a vehicle bumper of unusual function, that is to say, that while I provide shock absorbing means cooperating with each other, the one first receiving the shock or impact being so constructed as to withstand minor shocks, that is, shocks which do not have great force, without bringing into action the other of the shock absorbers. The shock absorber which first receives the impact comprises members semi-elliptical in shape, mounted in a horizontal plane, in such a manner as to deflect the object causing the impact and which are arranged to protect the bumper bars of the apparatus. It is also the object of my invention to provide additional means for deadening the shock, at the time received by the shock absorbers, without transmitting the complete shock over the entire vehicle, and in this respect, I provide cushions of rubber composition, between the apparatus and the means for mounting the apparatus in position.

A further contemplation of the invention is to provide a bumper of the character and for the purposes stated, one which, when mounted, is capable of vertical movement. In this connection I have provided a bumper which is sufficiently large to perform its respective functions, and it being capable of vertical movement, can be swung in an upwardly direction, in an out-of-way position. In my experience I have often found that in private garages or public garages, due to the bumpers of the machine, the vehicle is too large to occupy the ordinary space required for a vehicle and by being able to move the bumper in an upwardly direction, in an out-of-way place, there is very little additional space taken up when my improved bumper is associated with a vehicle.

Other objects will appear hereinafter.

The invention consists in the combinations and arrangements of parts hereinafter described and claimed.

Figure 6:
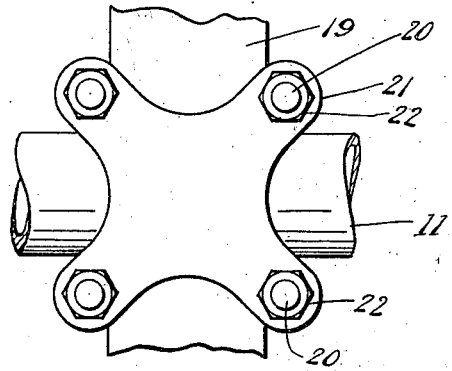

The invention will be best understood by reference to the accompanying drawings forming a part of this specification, and in which, Fig. 1 is a top plan view of a bumper embodying the invention, Fig. 2 is an elevational view of the same, Fig. 3 is a sectional detail view, of the same, taken substantially on line 3—3 of Fig. 2, Fig. 4 is a sectional detail view, of the same, taken substantially on line 4—4 of Fig. 3, Fig. 5 is a fragmentary sectional detail view, of the same, taken substantially on line 5—5 of Fig. 4, Fig. 6 is a detail view taken substantially on line 6—6 of Fig. 3.

Figure 7:
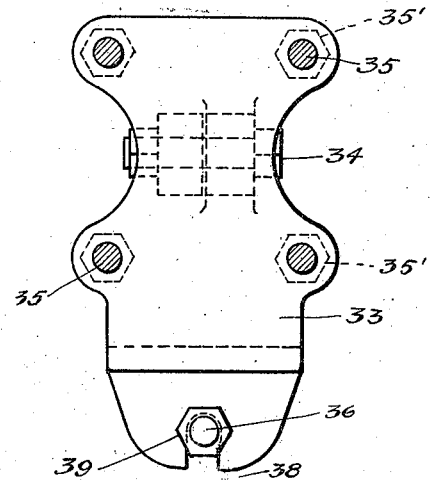
Figure 9:
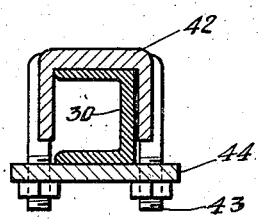
Figure 8:
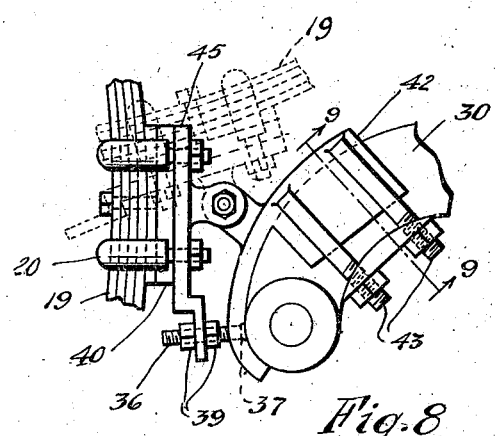

Fig. 7 is a detail view, of the same, taken substantially on line 7—7 of Fig. 3, Fig. 8 is a detail view of a modified form for mounting the bumper illustrated in Fig. 1, in position on a vehicle and, Fig. 9 is a detail view taken substantially on line 9—9 of Fig. 8.

In carrying these objects enumerated above, and other objects which will be disclosed as the description of my invention is unfolded, into effect, the preferred form of construction comprises bumper bars 11 which in this instance are tubular in form and have their opposite ends bent inwardly toward the vehicle with which my apparatus is used, the ends of the rod members being provided with suitable caps 12' as illustrated. The bumper bars 11 are arranged in parallel and spaced relation with respect to each other and carried and held in spaced relation by oppositely disposed columns 13 and 14, each of which comprises symmetrical parts A and B, as shown in Fig. 3, through which the bumper bars 11, pass. Associated with the columns 13 and 14 are shocked resisting members 15 which in this instance are formed of resilient material, having their end portions fixed to the columns 13 and 14 by bolts 16, and having curved portions, indicated at 15', Fig. 3, extending outwardly from the bars 11. The bolts 16 serve to hold the rods 11 between the parts of the columns and serve to clamp the symmetrical parts of the columns together.

The construction thus far disclosed constitutes one of the shock absorbers embodying the invention and which has been already referred to in setting forth the objects of the invention. It will be noticed by this construction that the semi-elliptical springs 15 are the first to come in contact with an object about to collide with a vehicle and the formation of the spring members are such that being elliptical in shape they will serve as deflectors, that is to say, causing the object coming into contact with them to be deflected to one side thus diminishing the force of the contact.

The columns 13 and 14 are preferably hollow to lessen the weight of the apparatus and the open ends of the columns are closed by caps 17 of suitable ornamental construction.

This portion of the apparatus, which I prefer to term the primary shock absorbers, is carried by a second set of shock resisters which in this instance comprises elliptical spring members 18 and 19 and detachably secured thereto by U-bolts 20, embracing the columns 13 and 14 and carrying star shaped plates 21 held in clamping engagement with the adjacent inner leaves of the springs 18 and 19 by suitable nuts 22. The leaves comprising the elliptical springs 18 and 19 are held in proper position by suitable bolts 23 screw threaded into spacers 24, as illustrated in Fig. 3. The spacer blocks 25 of the elliptical springs 18 and 19 are provided with recesses 26 having curved walls, as illustrated in Fig. 5, for the reception of the ends 27, of the inner leaves of the elliptical springs which are bent around bolt members 28. The purpose of the recesses 26, having curved walls, as illustrated, is such that when the semi-elliptical spring members collide with an object and the elliptical springs are compressed the ends will be permitted to oscillate in the recesses, preventing the destruction of the connections of the semi-parts of the elliptical springs 18 and 19.

As shown in Figs. 2 and 3, lamps 29, of suitable construction are carried by the spacer blocks 25, said lamps being of ornamental character to increase the æsthetic appearance of the bumper.

The elliptical springs 18 and 19 are attached to the chassis of a vehicle with which the device is used in the following manner:

In the preferred form, I detachably secure to each of the side bars of the chassis 30, by means of suitable bolts 31, a clamp 32 pivotally connected to a plate 33 as at 34, having a contour substantially similar to that of the side bar of the chassis to which the clamp is attached. The plate 33 is detachably secured to the adjacent elliptical spring by means of U-bolts 35, which embrace the spring and which is held in clamping engagement by suitable nuts 35', as best illustrated in Fig. 3.

The purpose of pivotally mounting the apparatus on the chassis has already been alluded to in setting forth the objects of the invention and it need only be brought out at this time that by such construction the utility of the bumper is greatly increased.

Means is provided for rigidly holding the apparatus in position, this means comprises a bolt 36 which is fixed permanently to the plate 32, as at 37. The outer end of the bolt 36 passes through a slot 38, formed in the plate 33 at its lower end thereof. The bumper is held in the desired angular position by adjustable nuts 39 which are screw threaded on the bolt 36, as illustrated in Fig. 3. When it is desired to move the apparatus in an upwardly direction, by loosening the nuts 39 the bolt can be brought out of engagement with the slot by the upward movement of the apparatus. The apparatus in its extreme upward position will remain in such position of its own accord due to the fact that the weight of the bumper as a whole bears behind its pivotal axis. In mounting the invention in the position illustrated in Fig. 2, I employ two such plates 32, and their respective parts, which as stated, are detachably secured to the side frame bars of the chassis 30.

As alluded to, at the time of pointing out the objects of the invention, means is provided for deadening the shock and preventing the transmission of minor or weak shocks over the entire body of the vehicle. This means comprises rectangularly shaped pads or cushions 40, preferably of a rubber composition or other compressible material interposed between the plates 33 and spacer plates 24, as illustrated in Fig. 3.

Referring now especially to Figs. 8 and 9 inclusive, I illustrate a modified form for detachably securing the apparatus to the chassis of the vehicle. Should the owner of the vehicle not care to drill holes in the chassis for the passage of the bolts 35, by the simple construction, as illustrated in the modified form, he can mount the apparatus without unnecessary labor or without damaging the chassis. In this connection I provide cap members 42 having contours similar to that of the chassis and having integral thread bearing fingers 43 which are adapted to pass through plate members 44 when the cap is mounted to embrace the chassis 30, in the position illustrated in Fig. 8. The caps are pivotally connected to plates 45 similar to the plate members 33. The apparatus is also capable of being adjusted and also being capable of vertical movement in the modified form of attachment as well as the preferred form of construction.

Referring again to the shock absorbers 18 and 19 it will be noticed that the same are capable, due to their location, of diminishing the shock before transmitted from the shock absorbers 15 to the chassis, greatly relieving the force of the shock transmitted to the vehicle proper.

By referring to the drawings, it will be seen that my invention is not only designed from an ornamental stand-point but is designed especially for utility and performs an unusual function which the present bumpers of this character, that are now in the market do not perform, that is, diminishing the shock before transmitted to the vehicle proper.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A bumper of the class described including bumper bars, means carrying said bumper bars for cushioning the resistance thereof, and means for attaching said resistance means to the chassis of a vehicle, and attaching means including plate members pivotally connected together and an adjustable lock member carried by one of said plate members for engagement with a slot formed in the other of said plate members.

2. A bumper of the class described including oppositely disposed hollow supports comprising parts fixed together, caps closing the open ends of said supports, bumper bars carried by said supports, means carried by said supports for cushioning the resistance of said bumper bars, means for attaching said cushioning means to the chassis of a vehicle, and shock absorbing means disposed between said cushioning means and said attaching means.

3. A bumper of the class described including shock absorbing means, means for attaching said shock absorbing means to the chassis of a vehicle, said means including plates fixed to said chassis and pivotally connected to plates carrying said shock absorbing means, and lock members carried by the plates fixed to said chassis for engagement with slots formed in the plates carrying said absorbing means.

4. A bumper of the class described including shock absorbing means, means for attaching said shock absorbing means to the chassis of a vehicle, said means including plates fixed to said chassis and pivotally connected to plates carrying said shock absorbing means, lock members carried by the plates fixed to said chassis for engagement with slots formed in the plates carrying said absorbing means, and shock absorbing cushions between said attaching means and said absorbing means.

5. A bumper of the class described including oppositely disposed hollow columns, caps closing the open ends of said columns, bumper bars carried by said columns in parallel and spaced relation with respect to each other and having their opposite ends turned inwardly, shock absorbing means carried on the face of said columns opposite said bumper bars, shock absorbing means at the rear of said columns, means for attaching said second named absorbing means to the chassis of a vehicle, said means comprising plate members pivotally connected together and lock members for permitting adjustment thereof.

6. A bumper of the class described including oppositely disposed hollow columns, caps closing the open ends of said columns, bumper bars carried by said columns in parallel and spaced relation with respect to each other and having their opposite ends turned inwardly, shock absorbing means carried on the face of said columns opposite said bumper bars between the inwardly turned ends thereof, shock absorbing means at the rear of said columns, means for attaching said second named absorbing means to the chassis of a vehicle, said means comprising plate members pivotally connected together and lock members for permitting adjustment thereof, and shock absorbing cushions between said attaching means and said second named shock absorbing means.

7. In combination with the chassis of a vehicle of oppositely disposed shock resisting members, pivotally carried by said chassis; means for permitting adjustment of said shock resisting members; tubular columns carried by said resisting members; bumper bars carried by said columns in parallel and spaced relation with respect to each other; and semi-elliptical shock resisting members carried by said columns in parallel and spaced relation with respect to each other, said first named resisting members being adapted to diminish the shock transmitted by said semi-elliptical resisting members to said chassis.

8. A vehicle bumper comprising in combination with the chassis of a vehicle of plates detachably carried by the side frame members of said chassis; plate members pivotally connected to said first named plate members; adjustable means for securing said second named plate members against pivotal movement; elliptical spring members detachably secured to said second mentioned plate members; columns comprising symmetrical parts detachably secured to said spring members; bumper bars carried in parallel and spaced relation by said columns; semi-elliptical spring members carried by said columns; and shock deadening means interposed between said elliptical spring members and said second mentioned plates.

9. A structure of the class described including oppositely disposed elliptical spring members positioned with their sides extending in a vertical plane, adjustable means affording attachment of said members to the chassis of a vehicle, supports fixed to the members opposite the attaching means, bars having inwardly turned end portions carried by the supports in parallel relation with respect to each other in a vertical plane, and shock absorbing members having their end portions fixed to the supports opposite the bars and having curved portions extending outwardly from the bars.

10. A structure of the class described including oppositely disposed elliptical spring members, adjustable means affording attachment of said members to the chassis of a vehicle, supports fixed to the members opposite the attaching means, bumper members carried by the supports and having inwardly turned ends extending beyond the outer side faces of the supports, and shock absorbing members having their end portions fixed to the supports and having curved portions extending outwardly from the bumper members.

11. A structure of the class described including oppositely disposed elliptical spring members having their sides extending in a vertical plane, supports comprising sectional parts carried by the spring members, bumper members carried by the supports and having inwardly turned ends extending beyond the outer side surfaces of the supports, and shock absorbing members having end portions fixed to the supports and having central curved portions extending outwardly from the bumper members.

12. A structure of the class described including oppositely disposed elliptical spring members having their sides extending in a vertical plane, supports comprising sectional parts carried by the spring members, bumper members carried by the supports and having inwardly turned ends extending beyond the outer side surfaces of the supports, shock absorbing members having end portions fixed to the supports and having central curved portions extending outwardly from the bumper members, and adjustable plate members pivotally connected together affording means for attaching the structure to the chassis of a vehicle.

13. A structure of the class described including supports having means of attachment to a vehicle, columns including sectional parts carried by said supports, hollow members carried by the columns and having inwardly bent portions extending beyond the outer sides thereof, and members of resilient material having their end portions fixed to the columns and having outwardly extending curved portions.

14. A structure of the class described including supports having means of attachment to a vehicle, columns comprising sectional parts carried by the supports opposite the attaching means, bumper members carried by the columns in spaced relation with respect to each other in a vertical plane and having end portions curved inwardly toward the vehicle, and shock absorbing members carried by the columns opposite the bumper members and having portions extending outwardly therefrom.

In testimony whereof I have signed my name to this specification in the presence of two subscribing witnesses.

JAMES A. NOMICOS.

Witnesses:
CLARENCE E. THREEDY,
JOSHUA R. H. POTTS.